US008809786B2

(12) United States Patent
Oulachgar et al.

(10) Patent No.: US 8,809,786 B2
(45) Date of Patent: Aug. 19, 2014

(54) MICROBOLOMETER DETECTOR WITH CENTRALLY-LOCATED SUPPORT STRUCTURE

(71) Applicant: Institut National D'Optique, Quebec (CA)

(72) Inventors: Hassane Oulachgar, Quebec (CA); Bruno Tremblay, Saint-Etienne de Lauzon (CA)

(73) Assignee: Institut National d'Optique, Quebec, Quebec (CA)

( * ) Notice: Subject to any disclaimer, the term of this patent is extended or adjusted under 35 U.S.C. 154(b) by 67 days.

(21) Appl. No.: 13/632,577

(22) Filed: Oct. 1, 2012

(65) Prior Publication Data

US 2014/0091217 A1 Apr. 3, 2014

(51) Int. Cl.
*G01J 5/20* (2006.01)
(52) U.S. Cl.
USPC .......................................... 250/338.3
(58) Field of Classification Search
CPC ........................................... G01J 5/20
USPC ........................................... 250/338.3
See application file for complete search history.

(56) References Cited

U.S. PATENT DOCUMENTS

| 3,684,996 | A * | 8/1972 | Schwarz | 338/18 |
|---|---|---|---|---|
| 6,201,243 | B1 | 3/2001 | Jerominek | |
| 6,448,557 | B2 | 9/2002 | Oda | |
| 7,180,063 | B2 | 2/2007 | Wada et al. | |
| 7,718,965 | B1 | 5/2010 | Syllaios et al. | |
| 2006/0255274 | A1 * | 11/2006 | Lin | 250/336.1 |
| 2009/0140145 | A1 * | 6/2009 | Ouvrier-Buffet et al. | 250/338.1 |
| 2011/0174978 | A1 | 7/2011 | Forg et al. | |

OTHER PUBLICATIONS

Oulachgar, H. et al. "Simulation and fabrication of large area uncooled microbolometers for Terahertz wave detection", 2011 36th International Conference on Infrared, Millimeter, and Terahertz Waves (IRMMW-THz 2011), 2011 IEEE.

* cited by examiner

*Primary Examiner* — David Porta
*Assistant Examiner* — Hugh H Maupin
(74) *Attorney, Agent, or Firm* — Merchant & Gould P.C.

(57) ABSTRACT

A microbolometer detector has an improved support structure. The microbolometer detector includes a substrate and a support structure including at least one post connected to and projecting substantially vertically from the substrate. The microbolometer detector also includes a platform held above the substrate and including a central region substantially vertically aligned with the at least one post of the support structure and a peripheral region surrounding the central region, the platform being supported by the support structure from the central region thereof. The microbolometer further includes at least one thermistor located in the peripheral region of the platform. A microbolometer focal plane array may also include multiple microbolometer detectors arranged in a two-dimensional array. The support structures are particularly well suited for supporting relatively large platforms of microbolometer detectors, particularly for far-infrared and terahertz detection and spectroscopy applications.

14 Claims, 10 Drawing Sheets

MICROBOLOMETER DETECTOR WITH CENTRALLY-LOCATED SUPPORT STRUCTURE

FIELD OF THE INVENTION

The present invention relates to the field of microbolometer detectors, and more particularly concerns a microbolometer detector having an improved support structure.

BACKGROUND OF THE INVENTION

Thermal detectors are detectors that operate by absorbing energy from electromagnetic radiation incident thereon and by converting the heat thus generated into an electrical signal representative of the amount of absorbed radiation. Perhaps the most prominent type of thermal detectors currently available is microbolometer detectors, usually shortened as microbolometers. A microbolometer is typically based on a suspended platform or bridge structure having a low thermal mass and on which is disposed a material having a temperature-dependent electrical resistance. The platform is generally held above and thermally insulated from a substrate by a support structure, and is provided with a thermistor, which is the resistive element whose electrical resistance changes in response to temperature variations caused by the absorbed radiation. The thermistor may, for example, be composed of a material having a high temperature coefficient of resistance (TCR) such as vanadium oxide.

The support structure generally includes support posts and arms (or legs) that provide mechanical stability and thermal insulation to the platform, as well as electrical connectivity between the thermistor and a readout electrical circuit provided in the substrate and containing circuitry for measuring changes in the resistance of the thermistor. Furthermore, in most current microbolometer designs the support structure (i.e. the support posts and arms) is generally distributed along an outer perimeter of the platform, while the thermistor is located in a central region of the platform, inwardly of the support structure. Such an arrangement of the support structure may be referred to herein as an "edge support" or an "edge post" configuration.

Arrays of microbolometer detectors may be fabricated on a substrate using common and relatively inexpensive integrated circuit fabrication techniques. Such arrays are often referred to as focal plane arrays (FPAs). They are capable of operating at room temperature without requiring cryogenic cooling, and can be used in a wide variety of applications, including night vision, observation of the Earth from space, pollution and fire detection, spectroscopy, and border control.

In most current applications, arrays of microbolometers are used to sense radiation in the infrared portion of the electromagnetic spectrum, usually in the mid-wave infrared, encompassing wavelengths of between about 3 and 5 µm (micrometers), or in the long-wave infrared, encompassing wavelengths of between about 8 and 14 µm. Arrays of microbolometer detectors are often integrated in uncooled thermal cameras for sensing incoming infrared radiation from a target scene. Each microbolometer detector of the array absorbs some infrared radiation resulting in a corresponding change in the microbolometer detector temperature, which produces a corresponding change in electrical resistance. A two-dimensional pixelated thermal image representative of the infrared radiation incident from the scene can be generated by converting the changes in electrical resistance of each microbolometer detector of the array into an electrical signal that can be displayed on a screen or stored for later viewing or processing. State-of-the-art arrays of infrared microbolometer detectors now include 1024 by 768 pixel arrays with a 17-µm pixel pitch.

In the last decade, there has been a growing interest toward extending microbolometer spectroscopy and sensing applications beyond the traditional infrared range, namely in the far-infrared and terahertz (or sub-millimeter) spectral regions. As known in the art, these portions of the electromagnetic spectrum have long been relatively unused for industrial purposes due to the lack of efficient techniques for detection and generation of radiation in this frequency range. However, in recent years, considerable attention has been devoted to the development of high-power sources for terahertz applications and to the improvement of the sensitivity of terahertz detectors. In particular, much research has been carried out for optimizing the sensitivity of microbolometer detectors and arrays thereof, notably by relying on various metallic and organic absorbers, antenna-coupled detectors, and frequency selective surfaces.

In many terahertz applications, the sensitivity of a detector is more important than the spatial resolution thereof. As a result, arrays of microbolometers having a relatively large pixel area, corresponding to a relatively large platform, are often preferable to achieve an efficient collection of radiation while providing an improved signal to noise ratio. For example, some microbolometers specifically designed for terahertz applications may have a platform with a surface area as large as 200 by 200 µm$^2$, which is considerably larger than that of their counterparts intended primarily for infrared imaging. However, increasing the size of the platform presents many design challenges, in particular related to the overall mechanical stability of the microbolometer detector.

There thus exists a need in the art for a microbolometer detector with a large platform suited for far-infrared and terahertz applications.

SUMMARY OF THE INVENTION

According to an aspect of the invention, there is provided a microbolometer detector. The microbolometer detector includes:
  a substrate;
  a support structure including at least one post connected to and projecting substantially vertically from the substrate;
  a platform held above the substrate and including a central region substantially vertically aligned with the at least one post of the support structure and a peripheral region surrounding the central region, the platform being supported by the support structure from the central region thereof; and
  at least one thermistor located in the peripheral region of the platform.

In some embodiments, the at least one post preferably includes two spaced-apart posts which may, but need not, be disposed substantially symmetrically relative to a center of the platform. Preferably also, each post has a proximal end connected to the substrate, a distal end terminating at the central region of the platform, and a substantially hollow cross-section between the proximal and distal ends.

In some embodiments of the microbolometer detector, the platform may be hollow at the central region thereof and the support structure may further include at least one support arm separated by thermal insulation gaps. In such embodiments, the at least one support arm extend within the central region of the platform, and connect the distal end of each post of the support structure to the peripheral region of the platform.

Further preferably, the microbolometer detector according to some embodiments may include an electrically conductive path that electrically connects the substrate to each thermistor.

According to another aspect of the invention, there is provided a microbolometer focal plane array including a plurality of microbolometer detectors as described above, wherein the plurality of microbolometer detectors is arranged in a two-dimensional array.

Other features and advantages of embodiments of the present invention will be better understood upon reading of preferred embodiments thereof with reference to the appended drawings.

Figure 1A:
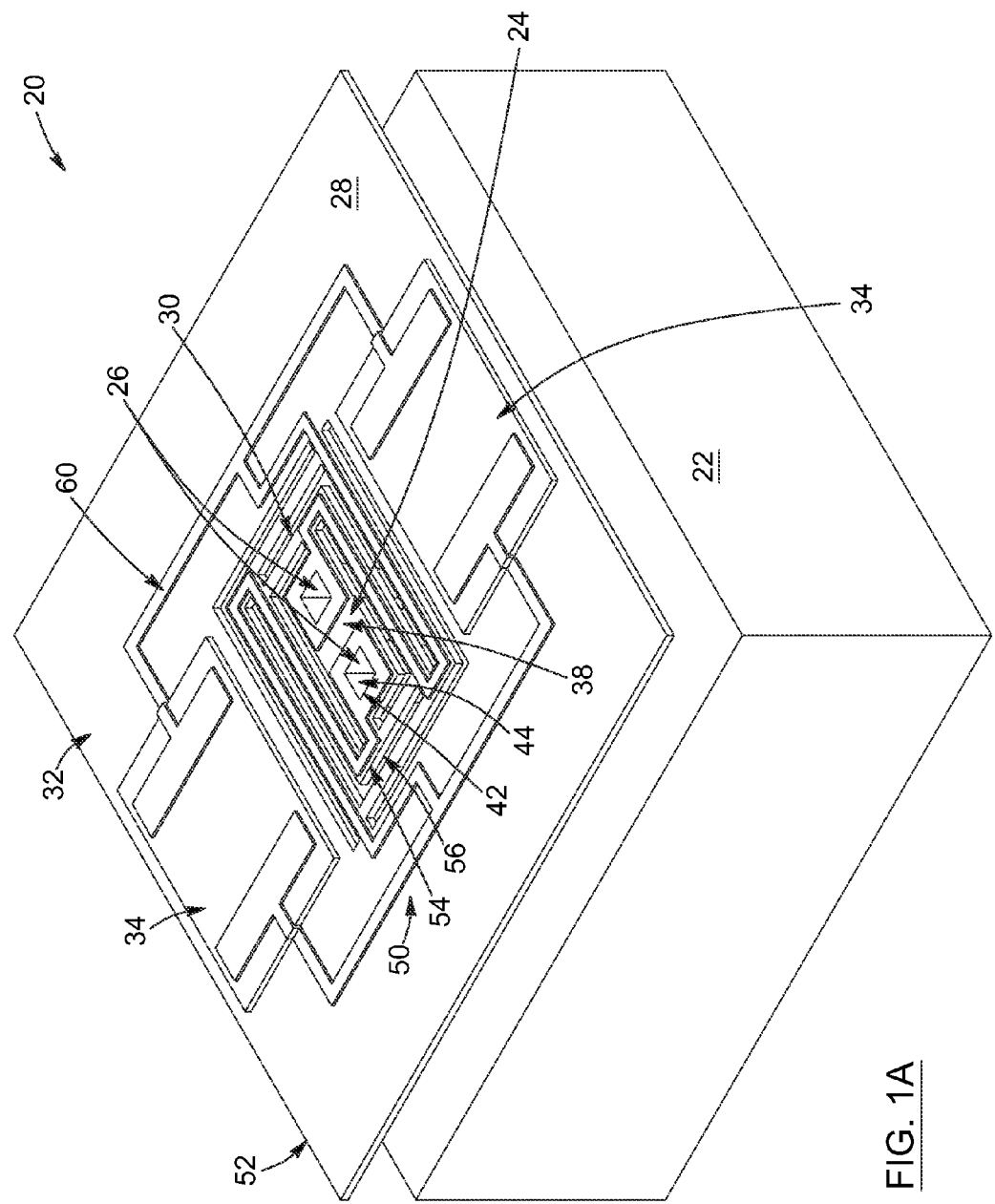
FIG. 1A is a schematic perspective view of a microbolometer detector in accordance with an embodiment of the invention.
Figure 1B:
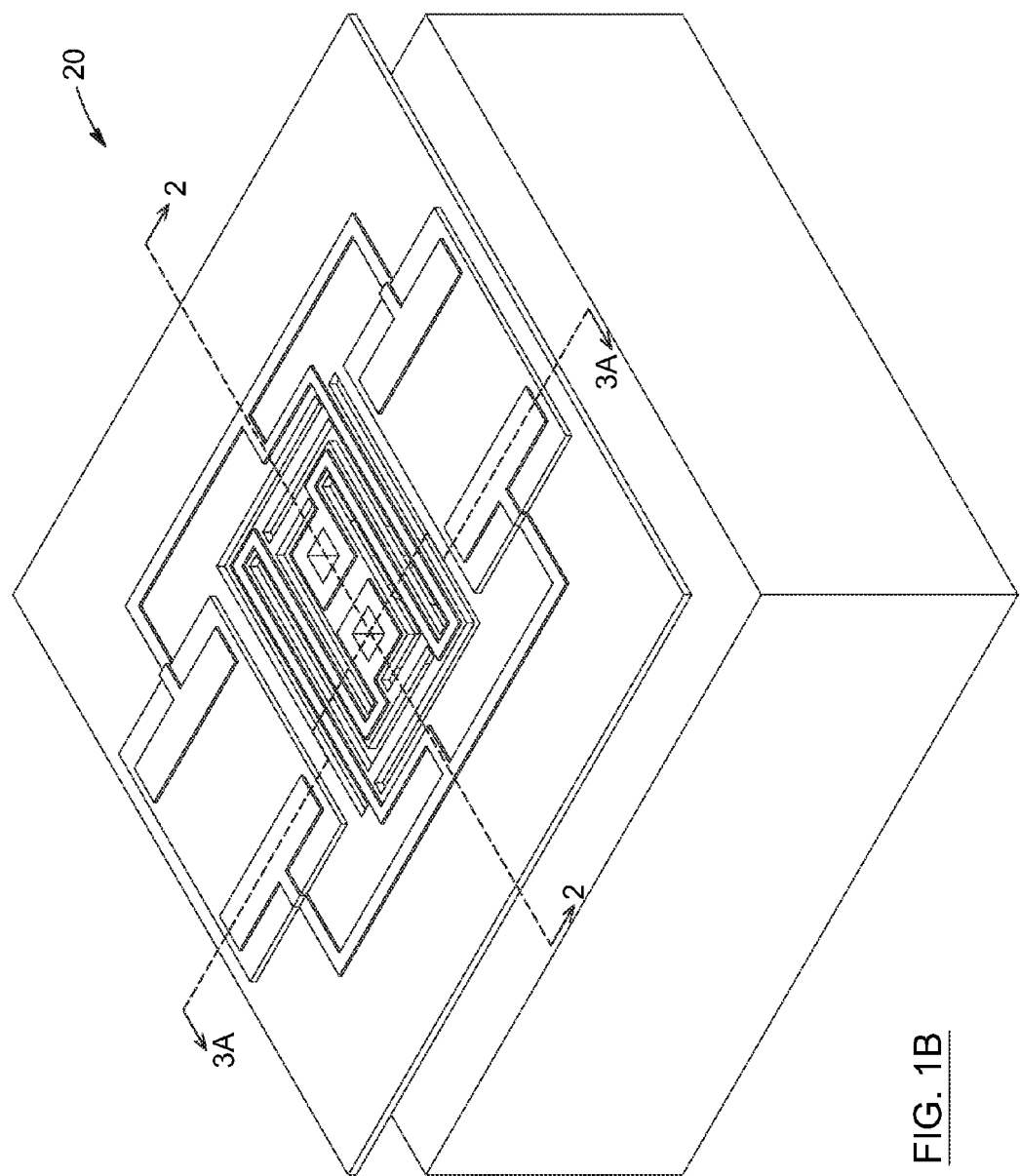
FIG. 1B shows the same microbolometer detector as FIG. 1A, wherein section lines 2 and 3A are indicated.
Figure 2:
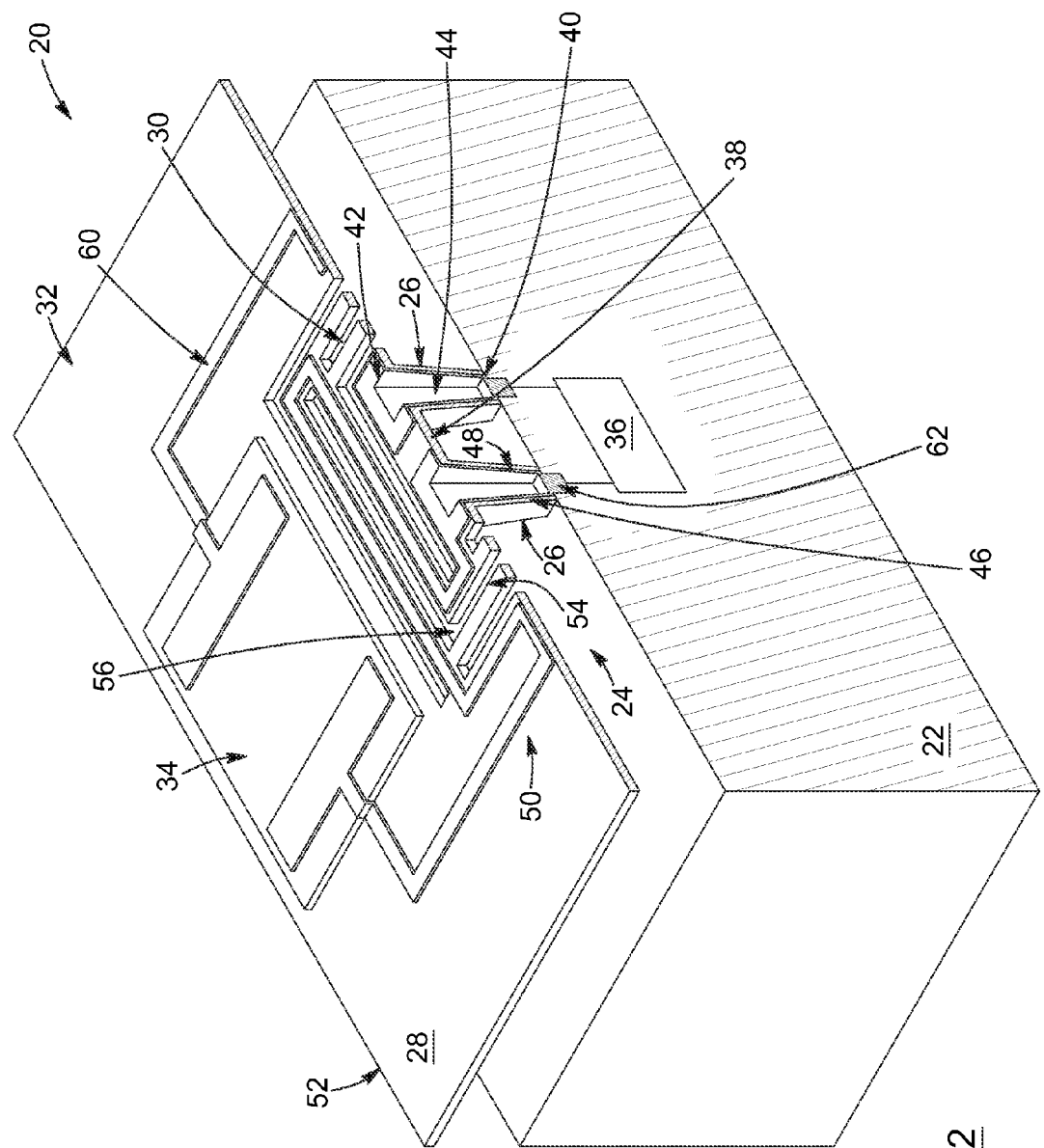
FIG. 2 is a cross-sectional perspective view of the microbolometer detector shown in FIG. 1B, taken along section line 2.

DESCRIPTION OF PREFERRED
EMBODIMENTS OF THE INVENTION

Embodiments of the present invention generally relate to microbolometer detectors having an improved support structure that provides enhanced structural stability and reduced mechanical stress. Embodiments of the present invention also relate to a focal plane array including a plurality of such microbolometer detectors.

Referring to FIGS. 1A to 3A, a microbolometer detector 20 according to one embodiment is shown. Broadly described, the microbolometer detector 20 includes a substrate 22, a support structure 24 including at least one post 26 connected to and projecting substantially vertically from the substrate 22, a platform 28 including a central region 30 surrounded by a peripheral region 32, and at least one thermistor 34 located in the peripheral region 32 of the platform 28. The support structure 24 provides the required mechanical stability for holding the platform 28 above the substrate 22 without inducing therein undue or excessive stresses or deformations. Advantageously, the platform 28 is supported by the support structure 24 from the central region 30 thereof. Further advantageously, the central region 30 of the platform 28 is substantially vertically aligned with the at least one post 26 of the support structure 24.

It should be understood herein that the elements of the drawings are not necessarily drawn to scale and that the emphasis is instead being placed upon clearly illustrating the elements and structure of the microbolometer detector 20. Moreover, in some instances, proportions may have been exaggerated or otherwise altered in order to to clearly illustrate features of the embodiments.

Throughout the present description, the term "microbolometer" is understood to refer to a thermal radiation detector, generally uncooled, that operates by absorbing incident electromagnetic radiation and converting the absorbed radiation into heat. The microbolometer also includes a thermistor, which is a resistive element whose electrical resistance changes in response to temperature variations caused by the absorbed radiation. This characteristic is used to measure amounts of radiation incident on the microbolometer. The microbolometer is generally thermally insulated from the substrate or surroundings to allow the absorbed incident radiation to generate a temperature change in the thermistor, and be less affected by the temperature of the substrate. Microbolometers are generally fabricated on the substrate using integrated circuit fabrication techniques and have applications in night vision, thermal imaging, remote sensing, spectroscopy, and infrared and terahertz radiation detection.

As most commonly known microbolometer structures, the microbolometer detector according to embodiments of the invention may be fabricated using conventional surface micromachining and photolithographic techniques. For example, in some embodiments, the microbolometer detector may be fabricated using a monolithic integration approach, wherein the substrate of the microbolometer detector, preferably provided with electrical readout integrated circuitry (ROIC), is pre-manufactured using standard complementary metal-oxide-semiconductor (CMOS) processes. In these embodiments, the support structure, the platform and the at least one thermistor of the microbolometer detector may subsequently be deposited and patterned on the substrate using common thin-layer deposition techniques paired with selective photoresist and sacrificial layer etching processes. However, it will be understood that the microbolometer detector according to embodiments of the invention may be fabricated using various other manufacturing techniques, for example bulk micromachining, without departing from the scope of the invention.

Embodiments of the present invention may be particularly useful for improving the mechanical stability of microbolometer detectors having a large-area platform, for instance a platform larger than about 100 by 100 $\mu m^2$, such as those optimized for detection and sensing of far-infrared and terahertz radiation, encompassing wavelengths between about 15 and 1000 $\mu m$.

However, while particularly useful for far-infrared and terahertz applications, one of ordinary skill in the art will understand that embodiments of the invention may be used in any application where it is necessary or desirable to provide microbolometer detectors with an improved support structure that enables fabricating relatively large platforms, while not compromising their overall mechanical stability. It will also be understood that while embodiments of the invention may be particularly well suited for high-sensitivity applications in the far-infrared and terahertz spectral ranges, they could additionally or alternatively be used in other regions of the electromagnetic spectrum without departing from the scope of the invention.

Continuing to refer to FIGS. 1A to 3A, the microbolometer detector 20 first includes a substrate 22.

The substrate 22 may be made of silicon (Si), silicon carbide (SiC), gallium arsenide (GaAs), germanium (Ge) or any other suitable substrate material that may, but need not, support integration of semiconductor devices.

As mentioned above, the substrate 22 may be provided with electrical readout integrated circuitry 36, which may be embodied, for example, by one or more CMOS circuitry layers formed on or in the substrate 22 according to conventional CMOS processes. Alternatively, electrical readout integrated circuitry 36 may be provided externally to the substrate 22. Moreover, the substrate 22 may be a multilayered structure made of several dielectric, semiconductor and metallic layers including, but not limited to, a radiation reflecting layer, one or more protective dielectric layers, and electrical contacts for electrical connection with the ROIC.

Still referring to FIGS. 1A to 3A, the microbolometer detector 20 also includes a support structure 24.

As used herein, the term "support structure" refers broadly to a structure that holds and mechanically supports the platform 28 of the microbolometer detector 20 in a spaced relationship above the substrate 22, preferably in a thermally-insulating manner. It may be advantageous for the support structure 24 to provide enough mechanical rigidity and strength for maintaining the platform 28 of the microbolometer detector 20 at a height of between about 1 and 20 µm from the substrate 22. It will be understood that the height of the platform 28 with respect to the substrate 22 may be selected, for example, based on the peak absorption wavelength of the microbolometer detector 20 and on the fabrication process thereof.

It will also be understood that, in addition to providing mechanical support, the support structure 24 may also serve the dual purpose of electrically connecting and thermally insulating each thermistor 34 from the substrate 22, as discussed further hereinbelow.

The support structure 24 includes at least one post 26 connected to and projecting substantially vertically from the substrate 22. Throughout the present description, the terms "vertical" and "vertically" refer to a direction perpendicular to a plane parallel to the conventional plane or surface of the substrate. Likewise, the terms "horizontal" and "horizontally" are used to refer to directions lying in a plane which is perpendicular to the vertical direction as just defined. Both terms are not meant to refer to a particular orientation of the microbolometer detector. It will be further understood that the term "post" as used herein refers generally to a structural element of the support structure that extends mainly vertically along a height thereof from the substrate. In particular, the height of each post essentially defines the spacing between the platform and the substrate.

Each post 26 illustrated in FIGS. 1A to 3A preferably includes a proximal end 40 connected to the substrate 22 and a distal end 42 terminating at the central region 30 of the platform 28. In addition, each post 26 preferably includes a substantially hollow cross-section 44 between the proximal and distal ends 40 and 42, which may be of any appropriate shape including, but not limited to, square, rectangular, triangular, circular, and elliptical. Moreover, the posts 26 may be, for example, between about 1 and 20 µm in height, as measured between the proximal and distal ends 40 and 42 thereof. As will be understood by one of ordinary skill in the art, in order to meet the thermal, mechanical, optical and electrical constraints of various applications, each post 26 of the support structure 24 may have a variety of lengths and cross-section shapes and dimensions, which are all considered to be within the scope of the present invention.

In the embodiment shown in FIGS. 1A to 3A, the support structure 24 includes two spaced-apart posts 26, which are disposed substantially symmetrically relative to a center 38 of the platform 28. In a given embodiment of the microbolometer detector 20, the two posts 26 may be separated from each other by a distance which may be selected according to various factors such as mechanical, thermal and fabrication requirements of the microbolometer detector 20. However, one of ordinary skill in the art will readily understand that the exemplary symmetrical two-post configuration shown in FIGS. 1A to 3A is given for illustrative purposes and that the support structure 24 of the microbolometer detector 20 may have other symmetrical or non-symmetrical configurations without departing from the scope of the present invention. In particular, the number, arrangement and separation of the at least one post 26 should not to be construed as limiting, as long as each post remains substantially vertically aligned with the central region 30 of the platform 28, as discussed in further detail hereinbelow.

Figure 3A:
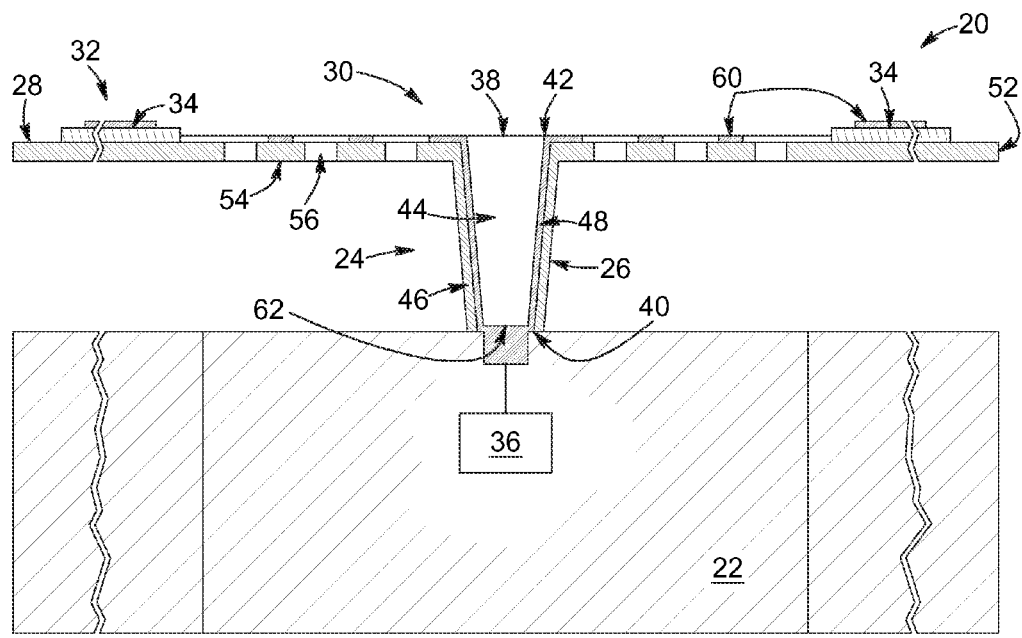
FIG. 3A is a cross-sectional view of the microbolometer detector shown in FIG. 1B, taken along section line 3A.
Figure 3B:
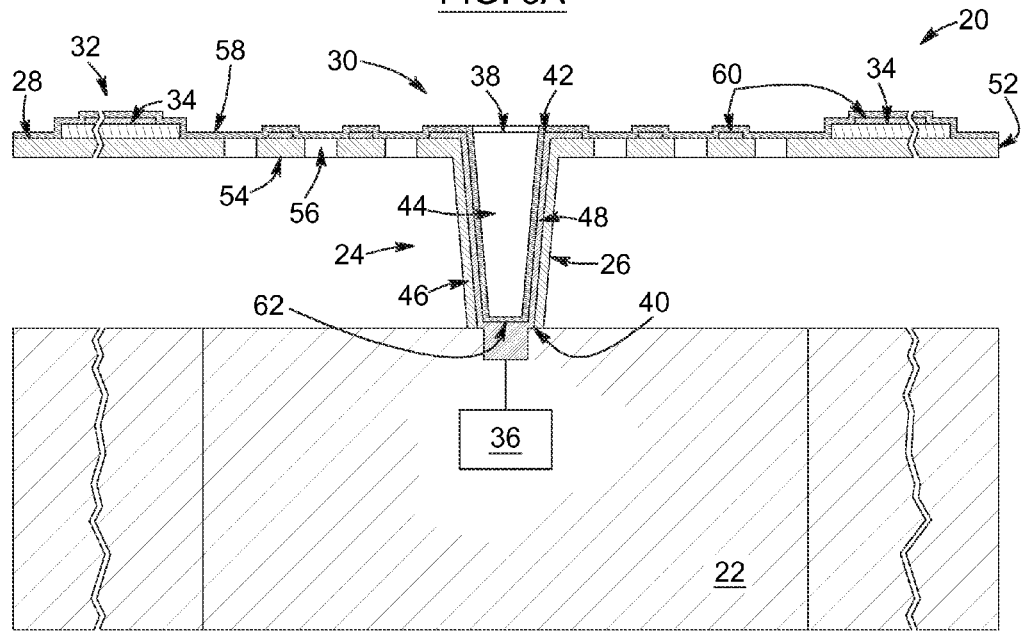
FIG. 3B is a cross-sectional view of a microbolometer detector having a thermistor protective layer deposited onto the surface of the platform opposite to the substrate, in accordance with an embodiment of the invention

Referring now more specifically to FIG. 3A, each post 26 of the support structure is preferably made of a thermally and electrically insulating, low stress and self-supporting material, for example silicon nitride or silicon dioxide, which may be provided in the form of one or more thin-film layers 46, each of which may about 0.05 to 0.5 µm thick.

As known in the art, for each post 26, the at least one thin-film layer 46 may have been deposited on the peripheral wall of an opening to the substrate defining the corresponding post 26. Each opening may have been previously patterned and formed by selective etching of a sacrificial layer such as a polyimide layer (not shown) deposited on the substrate 22. Each opening may also preferably include a slopped peripheral wall in order to facilitate deposition of the one or more thin-film layers 46 thereonto to form each post 26. In such embodiments, each post 26 of the support structure 24 may have an upwardly increasing cross section, which may, for example, be shaped substantially as an upside-down cone or pyramid, as illustrated in FIGS. 1A to 3A.

Each post 26 may also preferably include an electrically conductive layer 48 extending therealong between the proximal and distal ends 40 and 42 thereof for providing part of an electrically conductive path 50 electrically connecting the substrate 22 to each thermistor 34. The electrically conductive layer 48 is preferably characterized by high electrical conductivity and low thermal conductivity. Suitable materials for inclusion in the electrically conductive layer 48 include, without limitation, gold, aluminum, copper, silver, titanium, tungsten, chrome and vanadium.

Still referring to FIGS. 1A to 3A, and as briefly discussed above, the microbolometer detector 20 further includes a platform 28 held above the substrate. As used herein, the term "platform" generally refers to a substantially planar and rigid structure supported by the support structure and having greater horizontal dimensions (i.e. parallel to the substrate) than vertical thickness (i.e. perpendicular to the substrate).

The platform 28 may be shaped as a substantially rectangular single or multilayer thin film, which preferably includes thermally and electrically insulating, optically absorbing and low stress materials. Suitable materials for inclusion in the platform 28 include, without limitation, silicon nitride and silicon dioxide. In some embodiments, the platform 28 may have horizontal dimensions selected between about 50 and 1000 μm, and it may have a vertical thickness selected in the range of about 0.1 to 1 μm. However, it will be understood that depending on the intended application of the microbolometer detector 20, the platform 28 may take a variety of shapes and dimensions without departing from the scope of the invention. In particular, the horizontal dimensions of the platform 28 may be less than 50 μm without departing from the scope of the invention.

Continuing to refer to FIGS. 1A to 3A, the platform 28 includes a central region 30 substantially vertically aligned with the at least one post 26 of the support structure 24 and a peripheral region 32 surrounding the central region 30, the platform 28 being supported by the support structure 24 from the central region 30 thereof.

Throughout the present description, the term "central region" is intended to refer to a region of the platform extending outwardly from a center thereof so as to at least cover each post of the support structure. In this context, it will be understood that the term "vertically aligned" denotes that each post of the support structure is located underneath the central region of the platform. Moreover, the term "peripheral region" refers to a region of the platform distinct from and surrounding the central region, and extending outwardly toward an outer perimeter of the platform.

As mentioned above regarding the support structure 24, the platform 28 may generally be formed on top of a sacrificial layer (not shown), which may be coated on the substrate 22 during the fabrication process of the microbolometer detector 20 and be subsequently patterned, selectively etched and sacrificially removed, for example in an oxygen plasma. In some embodiments, the platform 28 may be fabricated concurrently and may share one or more material layers with the support structure 24.

In many applications, the sensitivity of a detector is more important than the spatial resolution thereof. As a result, microbolometer detectors having a relatively large pixel area, corresponding to a relatively large platform, are often preferable to achieve an efficient collection of radiation and to provide an improved signal to noise ratio. For example, in far-infrared and terahertz applications, it may be desirable to use microbolometer detectors having a platform with a surface area as large as 1000 by 1000 μm². It will be understood that such platform dimensions may be considerably larger than that of microbolometers primarily intended for infrared imaging.

Figure 6A:
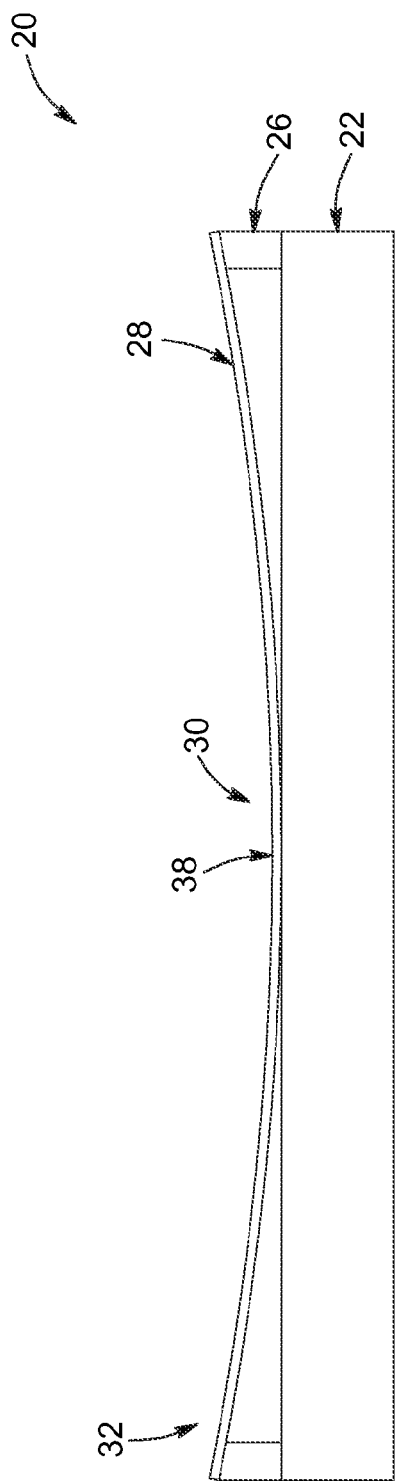
FIG. 6A is a schematic elevation view of an edge-supported microbolometer detector, wherein the platform exhibits a concave upward curvature that is sufficiently important for the platform to make contact with the underlying substrate.

However, as the platform reaches a certain size, the above-mentioned edge support configuration, wherein the underlying support structure of the microbolometer detector extends along the edge of the platform, may become inappropriate. This arises mainly because the support structure cannot adequately sustain and absorb the mechanical stresses induced therein by thermal processing during the fabrication process of the microbolometer detector. More specifically, as the size of the platform increases, the fabrication of edge-supported microbolometer detectors presents numerous challenges stemming, for instance, from structural reliability issues related to mechanical stresses induced in the support arms and to the deformation of the platform during the platform release process. This problem becomes more severe as the length of the support arms increases. As a result, the concave upward curvature of the platform may become sufficiently important for the central region of the platform to make contact with the underlying substrate, thus creating unwanted thermal is bridges that can severely degrade the performance of the detector, as illustrated in FIG. 6A.

It will be appreciated that positioning the at least one post 26 under the central region 30 of the platform 28, rather than along the outer perimeter 52 thereof, may provide significant enhancement in mechanical stability, more particularly in the case of a platform 28 with a relatively large surface area (e.g. larger than about 100 by 100 μm²), such as those intended for far-infrared and terahertz applications. As a result, embodiments of the present invention may advantageously reduce and allow a better control of the mechanical stresses and deformations induced in the microbolometer detector 20.

Figure 6B:
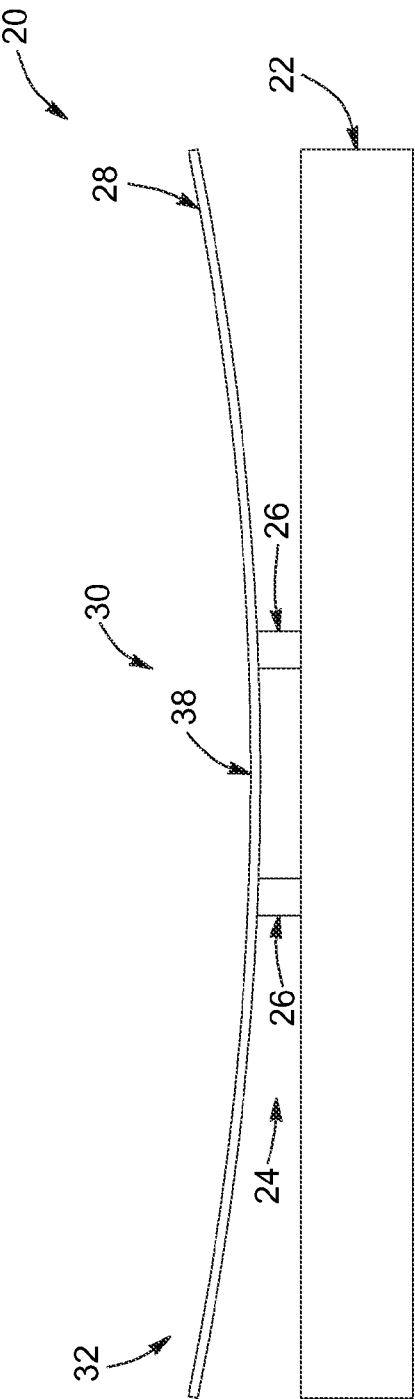
FIG. 6B is a schematic elevation view of a microbolometer detector in accordance with an embodiment of the invention, wherein the platform exhibits a concave upward curvature characterized by a negligible downward deformation at the center of platform.

In this regard, the elevation view of FIG. 6B depicts an exemplary schematic representation of the deformation profile of the platform 28 of a microbolometer detector 20 in accordance with an embodiment. In this example, the platform 28 is relatively large (e.g. larger than about 100 by 100 μm²) and the support structure 24 includes two-spaced apart posts 26 vertically aligned with the central region 30 of the platform 28. As may be seen, the platform 28 exhibits a concave upward curvature, with only a negligible downward deformation at the center 38 thereof. More particularly, the downward deformation at the center 38 of the platform 28 remains small and ensures that the platform 28 does not make contact with the underlying substrate 22, thus preventing the formation of thermal bridges that could adversely affect the performance of the microbolometer detector 20.

Referring back to FIGS. 1A to 3A, in some embodiments, the platform 28 of the microbolometer detector 20 may be hollow at the central region 30 thereof and the support structure 24 may further include at least one support arm 54 separated by thermal insulation gaps 56. The at least one support arm 54 extends within the central region 30 of the platform 28 and connects the distal end 42 of each post 26 of the support structure 24 to the peripheral region 32 of the platform 28.

As used herein, the term "support arm" refers broadly to a structural element of the support structure that extends mainly horizontally, by contrast with the previously defined term "post" that refers to a mainly vertical structural element of the support structure.

It will be understood that each support arm need not be straight, but may also include transverse sections and be arranged according to meandering or serpentine configurations. Such geometric patterns may allow controlling the effective length of and the temperature gradient maintained by the support arm configuration, as well as the resulting thermal insulation by the support structure. In particular, the provision of a meandering or serpentine support arm configuration may increase the effective length of the support structure, even when each individual support arm remains relatively short.

Figure 7A:
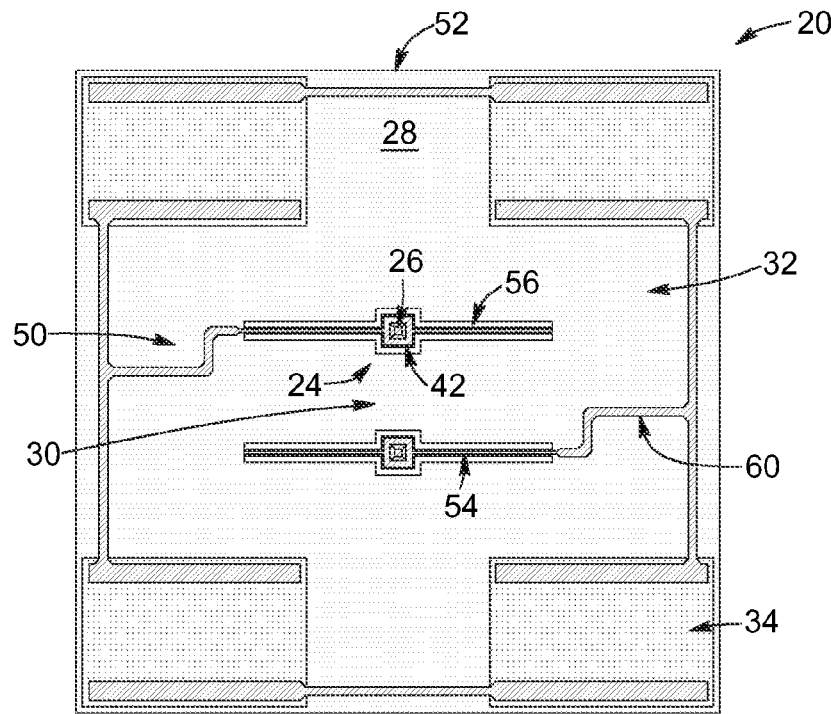
FIGS. 7A to 7D are schematic top plan views of microbolometer detectors having different support arm, thermistor and electrode configurations, in accordance with four embodiments of the invention.
Figure 7B:
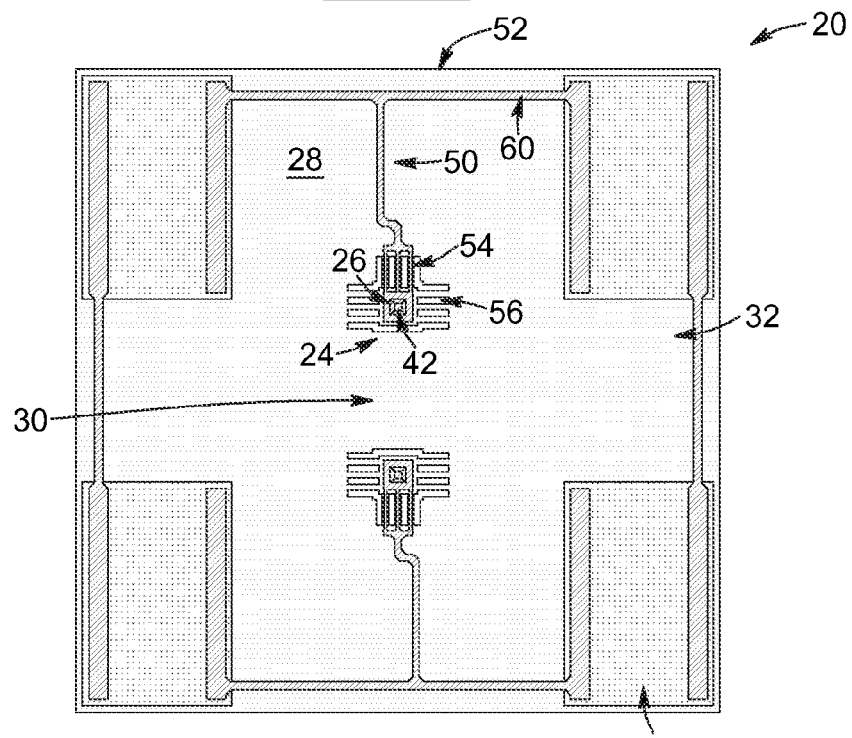
Figure 7C:
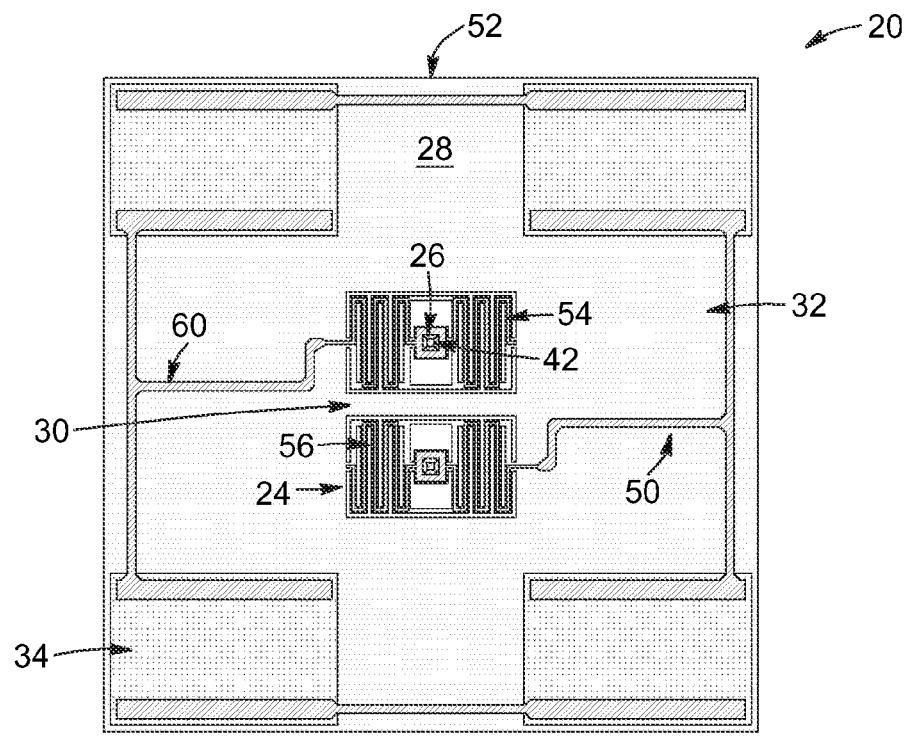
Figure 7D:
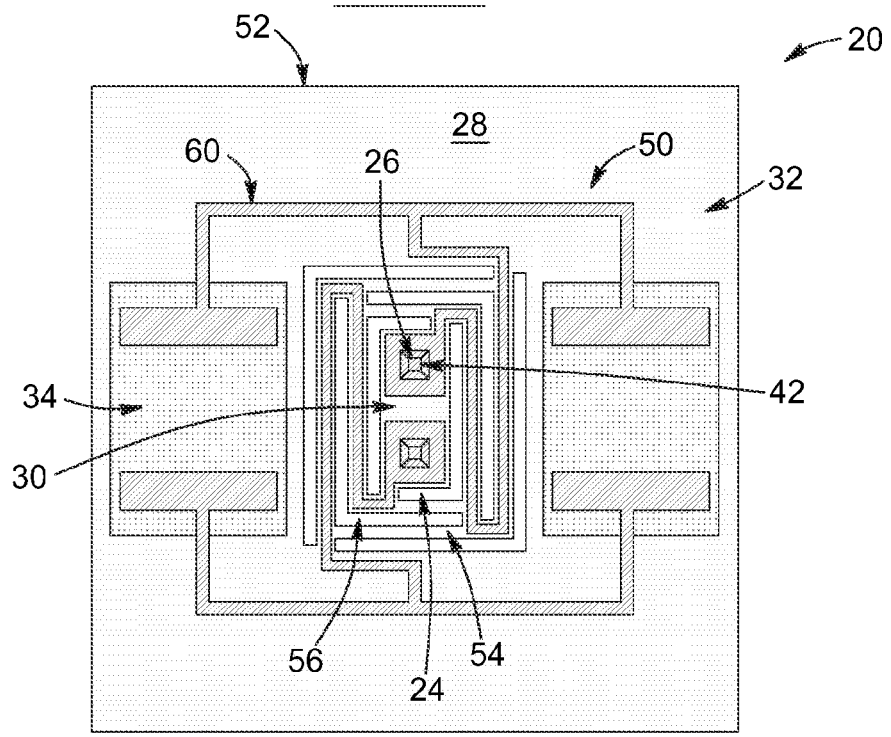

Referring now to FIGS. 7A to 7D, there are shown top plan views of the microbolometer detector 20, in accordance with four different embodiments. In each of these embodiments, the microbolometer detector 20 includes two spaced-apart posts 26 and a platform 28 having a hollow central region 30. It will be noted that FIG. 7D depicts the same embodiment as FIGS. 1A to 3A. Each embodiment includes a different arrangement of support arms 54 and thermal insulation gaps 56. The support arms 54 extend within the central region 30 and connect the distal end 42 of each post 26 of the support structure 24 to the peripheral region 32 of the platform 28.

It will be understood by one of ordinary skill in the art that the number, length, thickness, separation and arrangement of the at least one support arm within the central region of the platform may be adjusted in order to optimize the thermal conductance, response time and responsivity of the microbolometer detector for meeting constraints and performance requirements of various applications. In this regard, it will thus be understood that the support arm configurations depicted in FIGS. 7A to 7D are provided for illustrative purposes and that embodiments of the invention are not limited to particular configurations of the support arms 54 within the central region 30 of the platform 28.

Referring back to FIGS. 1A to 3A, embodiments of the present invention may advantageously contribute to accelerating the removal of the sacrificial layer (not shown) when releasing the platform 28 and the support structure 24 during the fabrication thereof. Indeed, the sacrificial layer is commonly removed by oxygen plasma etching. Hence, it will be recognized that positioning the at least one post 26 of the support structure 24 underneath the central region 30 of the platform 28 and providing at least one support arm 54 separated by thermal insulating gaps 56 may enhance the exposure of the sacrificial layer to the oxygen plasma and thus facilitate the removal thereof. Moreover, in some embodiments, the platform 28 may be provided with release holes in order to further accelerate the removal of the sacrificial layer and thus avoid excessive thermal stress during the release process. Such release holes may be particularly advantageous for microbolometer detectors 20 having a platform 28 with horizontal dimensions greater than 100 μm, It will be understood, however, that the support structure 24 need not be provided with support arms 54 and that some embodiments may include a continuous platform 28 (i.e. without a hollow central region 30) without departing from the scope of the invention. However, in some embodiments, the continuous platform 28 could be provided with release holes in order to reduce the time needed to release the platform 28 during the removal of the sacrificial layer.

Still referring to FIGS. 1A to 3A, the microbolometer detector 20 also includes at least one thermistor 34 located in the peripheral region 32 of the platform 28.

As used throughout the present description, the term "thermistor" generally refers to a thermally sensitive resistor and is meant to encompass any material, structure or device having an electrical resistance that changes as a function of its temperature, preferably in a predictable and controllable manner.

Each thermistor 34 may be made of a material having a high TCR near room temperature, preferably of at least 0.5% per kelvin, including but not limited to a vanadium oxide material, a titanium oxide material or an amorphous silicon material. However, it will be understood that the composition of each thermistor 34 of the microbolometer detector 20 is not limited to those cited above. Any suitable material or combination of materials having a suitable TCR is considered to be encompassed within the scope of the present invention.

The at least one thermistor 34 of the microbolometer detector 20 may be deposited onto the platform 28 using common deposition techniques such as evaporation, sputtering, spin coating or any other appropriate thin-film transfer technique. Likewise, the size, shape and disposition of each thermistor 34 may be subsequently delineated by means of various selective wet and dry etching techniques combined with standard photolithographic processes.

While not shown in FIGS. 1A to 3A for the purpose of better illustrating the at least one thermistor 34, the platform 28 may further include a protective layer 58 of thermally insulating and optically absorbing material (e.g. silicon nitride or silicon dioxide), which is deposited over the at least one thermistor 34 for protecting the same and for improving the stability of the platform 28 by minimizing deformations and controlling mechanical stresses. An embodiment of a microbolometer detector 20 that includes such a protective layer 58 is illustrated in FIG. 3B. It will be understood that, in this embodiment, the protective layer 58 is also deposited inside each post 26 of the support structure to form the innermost thin-film layer 46 thereof.

Referring back to FIGS. 1A to 3A, in some embodiments, each thermistor 34 may be a thin film element having a substantially rectangular shape with a width, length and thickness which may be selected according to a desired electrical resistance of the corresponding thermistor 34. Of course, each thermistor 34 may have various shapes and sizes without departing from the scope of the invention.

By contrast with conventional edge-supported microbolometer detectors provided with a single thermistor element in the central region of the platform, embodiments of the present invention advantageously and more readily accommodate the presence of more than one thermistor, which may be identical or different and be arranged according to symmetrical or non-symmetrical configurations. It will also be understood that the positioning of the at least one thermistor in the peripheral region of the platform may contribute to improve the thermal insulation between the substrate and each thermistor.

In this regard, each of the above-discussed embodiments of FIGS. 7A to 7D includes a substantially rectangular platform 28 and a plurality of thermistors 34 located in the peripheral region 32 of the platform 28 according to different symmetrical arrangements. For example, the embodiments of FIGS. 7A to 7C each includes four thermistors 34 located near four opposite corners of the platform 28, while the embodiment of FIG. 7D includes two thermistors 34 located near opposite edges of the platform 28. However, it will be understood that the thermistor configurations shown in FIGS. 7A to 7D are provided for exemplary purposes. In particular, the number and arrangement of the at least one thermistor 34 should not be construed as limiting, as long as each thermistor 34 remains located in the peripheral region 32 of the platform, as mentioned above.

Referring back to FIGS. 1A to 3A, and as briefly discussed above, the microbolometer detector 20 may preferably include an electrically conductive path 50 electrically connecting the substrate 22 to each thermistor 34. In particular, in the illustrated embodiment, the electrically conductive path 50 preferably includes at least one electrode 60 electrically connecting, via at least one of the at least one support arm 54, each thermistor 34 to the distal end 42 of each post 26. Each electrode 60 may be deposited and delineated using known microfabrication techniques and may be made of any suitable material including, without limitation, gold, aluminum, titanium, copper, silver, tungsten, chrome and vanadium. It will be understood that the width and thickness of each electrode 60 may be adjusted to procure a thermal conductance that optimizes the performance of the microbolometer detector 20. Moreover, in some embodiments, a protective layer (e.g. silicon nitride or silicon dioxide) may be deposited on the at least one electrode 60 for protecting the same.

It will also be understood that, in embodiments provided with more than one thermistor 34, it may be possible to adjust the equivalent resistance of the plurality of thermistors 34. This may be achieved by configuring the at least one electrode 60 so that the plurality of thermistors 34 is connected in a series, parallel or series-parallel circuit scheme. Advantageously, this may provide an additional degree of freedom for adjusting the resistance of the thermistors 34 as compared to conventional microbolometer detectors having a single thermistor whose resistance is essentially defined by the shape and composition thereof, and the distance between the electrodes connected thereto.

The electrically conductive path 50 may also include an electrically conductive layer 48, such as described above, which extends along each post 26 between the proximal and distal ends 40 and 42 thereof. In such embodiments, the electrically conductive layer 48 preferably electrically connects each electrode 60 to the substrate 22. It will be understood that the electrically conductive layer 48 and the at least one electrode 60 may be, but need not, be made of the same material.

Furthermore, in some of these embodiments, the substrate may, as mentioned above, include electrical readout integrated circuitry 36 electrically connected to the electrically conductive path 50 extending along each post 26, for example by means of electrically conductive contact pads 62 deposited at the bottom of each post 26 during the fabrication thereof.

Figure 4:
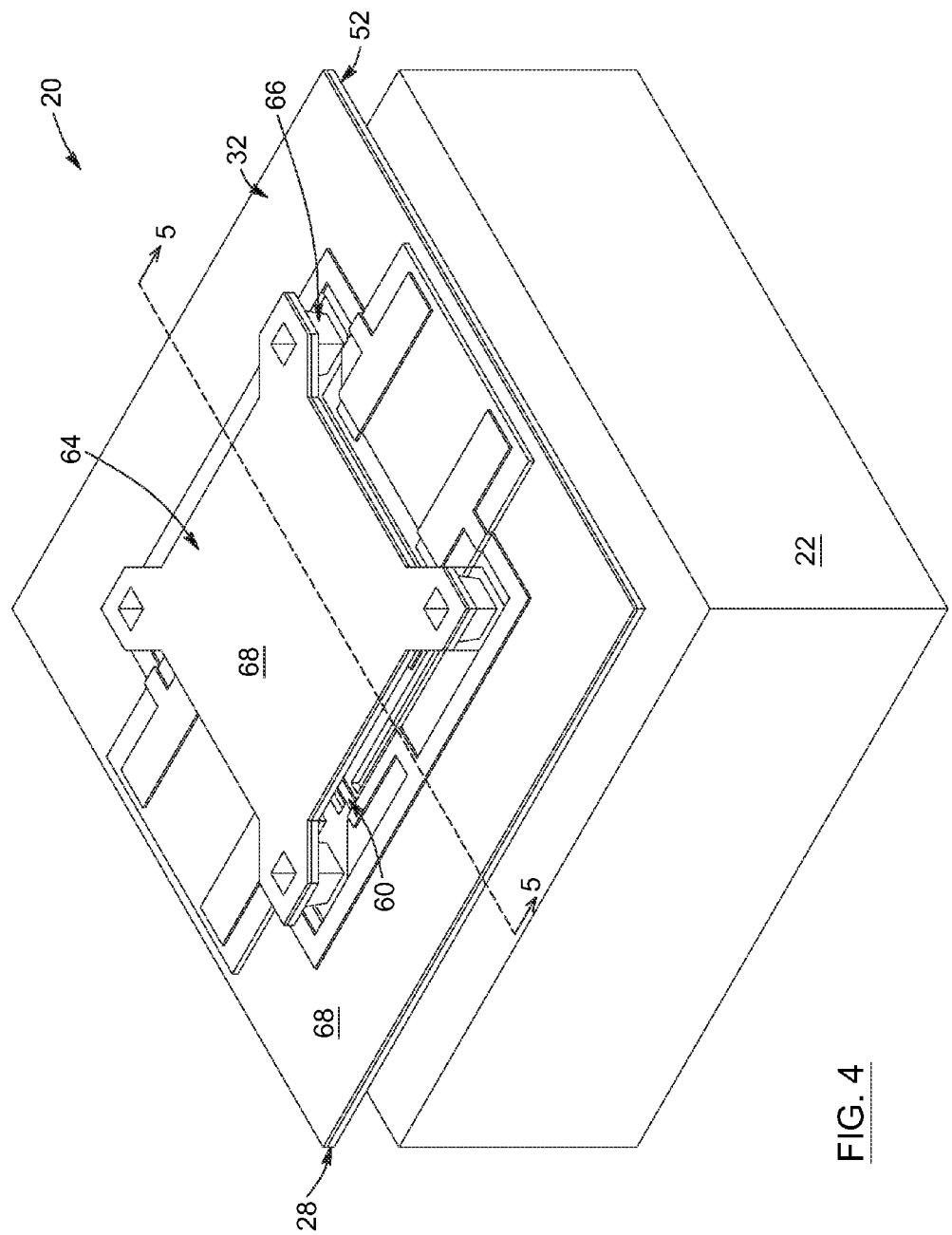
FIG. 4 is a schematic perspective view of a microbolometer detector in accordance with another embodiment of the invention, wherein the peripheral region of the platform and the shield both include an optically absorbing layer deposited on a respective surface thereof opposite to the substrate, in accordance with an embodiment of the invention.
Figure 5:
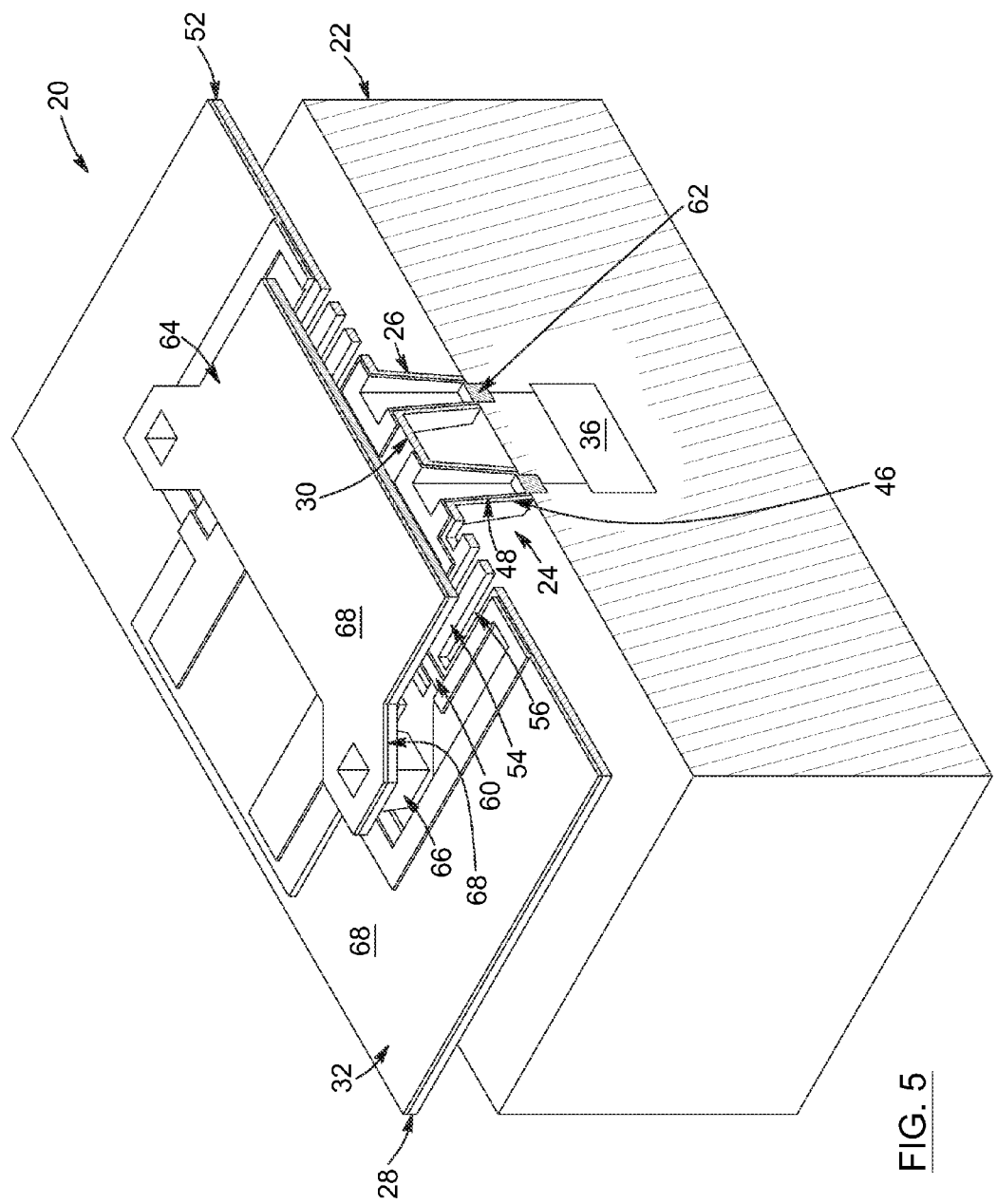
FIG. 5 is a cross-sectional perspective view of the microbolometer detector shown in FIG. 4, taken along section line 5.

Referring now to FIGS. 4 and 5, in some embodiments, the microbolometer detector 20 may further include a shield 64 supported above the platform 28 in a spaced relationship therewith, the shield 64 covering substantially the central region 30 of the platform 28. In the illustrated embodiment, the shield 64 is maintained above the platform 28, for example at a height between about 1 and 5 μm, by four pillars 66 located near four opposite corners of thereof, but other types of support arrangement could be envisioned without departing from the scope of the invention. It will also be understood that the horizontal dimensions of the shield 64 may be varied in accordance with the size of the central region 30 of the platform 28. Moreover, as for the platform 28, the shield 64 is preferably made of a thermally and electrically insulating, low stress and self-supporting material, for example silicon nitride or silicon dioxide.

In some embodiments, the microbolometer detector 20 may further include an optically absorbing layer 68 deposited on the peripheral region 32 of the platform 28 and on the shield 64 and extending on a respective surface thereof opposite to the substrate 22. Suitable materials for the optically absorbing layer 68 include, without being limited to, chromium, nickel-chromium, vanadium, titanium, titanium-nitride, metal black, and organic black.

It will be understood that by covering substantially the central region 30 of the platform 28, the shield 64 may advantageously allow the optically absorbing layer 68 to be deposited only on the peripheral region 32 of the platform 28. As a result, the optically absorbing layer 68 establishes a thermal contact with the at least one thermistor 34 but remains free of any contact with the support structure 24. In particular, in the embodiment of FIGS. 4 and 5, each pillar 66 supporting the shield 64 projects upwardly from the peripheral region 32 of the platform 28 but does not make contact with the support arms 54, so as not to create thermal bridges that could degrade the performance of the microbolometer detector 20.

Figure 8:
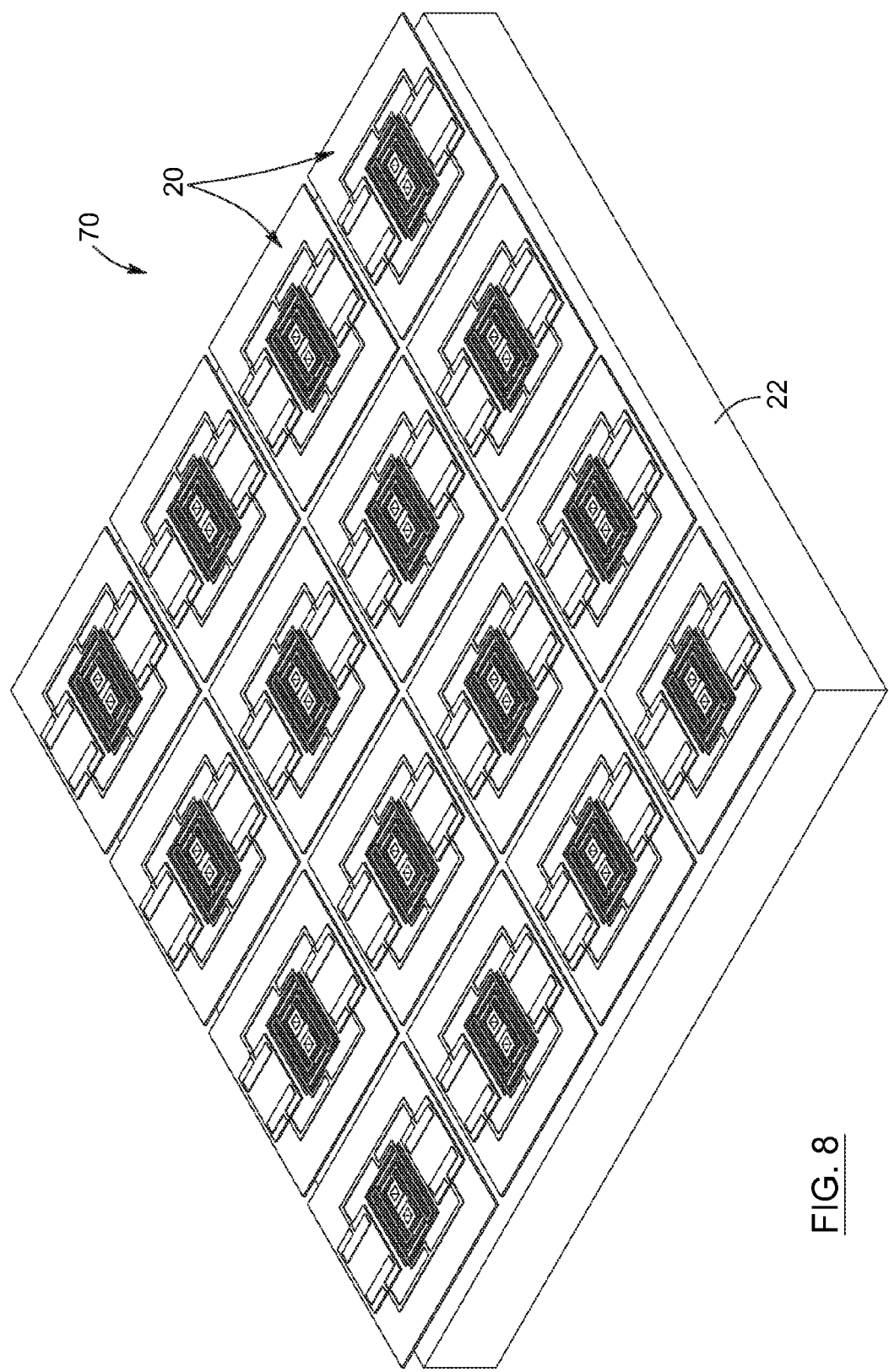
FIG. 8 is a schematic perspective view of a microbolometer focal plane array including a plurality of microbolometer detectors arranged in a two-dimensional array, in accordance with an embodiment of the invention.

Referring now to FIG. 8, in accordance with another aspect of the invention, there is provided a microbolometer focal plane array 70. The microbolometer focal plane array 70 includes a plurality of microbolometer detectors 20 such as described above, wherein the plurality of microbolometer detectors 20 is arranged in a two-dimensional array. While FIG. 8 depicts a 4 by 4 array for clarity, it will be recognized that in other embodiments, the total number of microbolometer detectors 20 in the focal plane array 70 could be higher or lower depending on the intended application. In some embodiments, the microbolometer focal plane array 70 may include microbolometer detectors 20 arranged in an array of pixels, wherein the distance between two nearest-neighbor microbolometer detectors 20 (e.g. the pixel pitch) may be between about 100 and 400 μm.

It will also be understood that in order to meet the constraints of a particular application, the microbolometer focal plane array 70 may include identical or different microbolometer detectors 20 without departing from the scope of the present invention. Furthermore, it should be noted that while the microbolometer detectors 20 are arranged to form a two-dimensional array in the embodiment of FIG. 8, they may alternatively be configured as a linear array or be provided at arbitrary locations that do not conform to a specific pattern.

Of course, numerous modifications could be made to the embodiments described above without departing from the scope of the present invention.

The invention claimed is:

1. A microbolometer detector comprising:
a substrate;
a support structure comprising at least two spaced apart posts connected to and projecting substantially vertically from the substrate;
a platform held above the substrate and comprising a central region substantially vertically aligned with the at least two spaced apart posts of the support structure and a peripheral region surrounding the central region, the platform being supported by the support structure from the central region thereof; and
at least one thermistor located in the peripheral region of the platform.

2. The microbolometer detector according to claim 1, wherein each post comprises a proximal end connected to the substrate and a distal end terminating at the central region of the platform.

3. The microbolometer detector according to claim 2, wherein each post further comprises a substantially hollow cross-section between the proximal and distal ends.

4. The microbolometer detector according to claim 1, wherein the at least two spaced apart posts consist of two spaced-apart posts.

5. The microbolometer detector according to claim 1, wherein the at least two spaced-apart posts are disposed substantially symmetrically relative to a center of the platform.

6. The microbolometer detector according to claim 2, wherein the platform is hollow at the central region thereof, and wherein the support structure further comprises at least one support arm separated by thermal insulation gaps, the at least one support arm extending within the central region of the platform, and connecting the distal end of each post of the support structure to the peripheral region of the platform.

7. The microbolometer detector according to claim 1, further comprising an electrically conductive path electrically connecting the substrate to each thermistor.

8. The microbolometer detector according to claim 6, further comprising an electrically conductive path comprising:
at least one electrode electrically connecting, via at least one of the at least one support arm, each thermistor to the distal end of each post; and
an electrically conductive layer extending along each post between the proximal and distal ends thereof, the electrically conductive layer electrically connecting each electrode to the substrate.

9. The microbolometer detector according to claim 7, wherein the substrate comprises electrical readout integrated circuitry electrically connected to the electrically conductive path.

10. The microbolometer detector according to claim 1, wherein the platform is substantially rectangular in shape and wherein the at least one thermistor comprises four thermistors located near four opposite corners of the platform.

11. The microbolometer detector according to claim 1, wherein the platform is substantially rectangular in shape and wherein the at least one thermistor comprises two thermistors located near two opposite edges of the platform.

12. The microbolometer detector according to claim 1, further comprising a shield supported above the platform in a spaced relationship therewith, the shield covering substantially the central region of the platform.

13. The microbolometer detector according to claim 12, further comprising an optically absorbing layer deposited on the peripheral region of the platform and on the shield and extending on a respective surface thereof opposite to the substrate.

14. A microbolometer focal plane array comprising a plurality of microbolometer detectors according to claim 1, wherein the plurality of microbolometer detectors is arranged in a two-dimensional array.

* * * * *